United States Patent
Walker et al.

(10) Patent No.: US 12,468,841 B1
(45) Date of Patent: Nov. 11, 2025

(54) SYSTEM FOR PROVIDING SELECTIVE ACCESS TO USER INFORMATION

(71) Applicant: Wells Fargo Bank, N.A., San Francisco, CA (US)

(72) Inventors: Shawn Walker, Charlotte, NC (US); Kayli Wolford, Charlotte, NC (US); Emily Palmer Brown, Charlotte, NC (US); John Andrew Chuprevich, Davidson, NC (US); Matthew Wheeler, Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 291 days.

(21) Appl. No.: 18/150,019

(22) Filed: Jan. 4, 2023

(51) Int. Cl.
*G06F 21/62* (2013.01)
*G06F 16/25* (2019.01)

(52) U.S. Cl.
CPC ........ *G06F 21/6245* (2013.01); *G06F 16/258* (2019.01); *G06F 2221/2115* (2013.01)

(58) Field of Classification Search
CPC .............. G06F 21/6245; G06F 16/258; G06F 2221/2115
See application file for complete search history.

(56) References Cited

U.S. PATENT DOCUMENTS

| | | | | |
|---|---|---|---|---|
| 8,914,856 | B1* | 12/2014 | Velummylum | G06F 21/6218 726/19 |
| 8,931,041 | B1* | 1/2015 | Banerjee | G06F 21/6245 726/1 |
| 10,979,432 | B1* | 4/2021 | Frank | H04L 63/104 |
| 11,030,701 | B1* | 6/2021 | Brannan | G06F 16/9035 |
| 11,461,394 | B2* | 10/2022 | Probst | G06F 16/835 |
| 11,556,398 | B2* | 1/2023 | Tan | G06F 3/067 |
| 12,021,804 | B2* | 6/2024 | Gandhi | H04L 67/02 |
| 2007/0150315 | A1* | 6/2007 | Bennett | G16H 10/60 707/999.009 |
| 2018/0196859 | A1* | 7/2018 | Srivastava | G06F 16/2365 |
| 2018/0322304 | A1* | 11/2018 | Kafai | G06F 16/24578 |
| 2022/0198394 | A1* | 6/2022 | Chandra | H04L 63/0807 |
| 2022/0284120 | A1* | 9/2022 | Cook | G06F 21/6245 |
| 2023/0095852 | A1* | 3/2023 | Paez | H04L 67/1087 717/170 |

* cited by examiner

*Primary Examiner* — Carl G Colin
*Assistant Examiner* — Andrew Suh
(74) *Attorney, Agent, or Firm* — Kilpatrick Townsend & Stockton LLP (57) ABSTRACT

A trusted data management system (TDMS) receives, from a third party system, a request for user data and a user identifier. The TDMS identifies a data sharing schema from a set of data sharing schemas associated with the user identifier. The data sharing schema defines a subset of data values of the user data. The data sharing schema also defines, for each data value of the subset of data values of the subset of the user data, a format for transmitting the data value. The TDMS retrieves, from a data storage unit, the subset of data values of the user data. The TDMS formats each data value of the subset of data values in accordance with the respective defined format of the data value. The TDMS transmits, to the third party system, the subset of user data in accordance with the data sharing schema.

14 Claims, 4 Drawing Sheets

SYSTEM FOR PROVIDING SELECTIVE ACCESS TO USER INFORMATION

TECHNICAL FIELD

This disclosure generally relates to secure distribution of data. More specifically, but not by way of limitation, this disclosure relates to schemas for secure distribution of data to third party systems.

BACKGROUND

Reputable data management systems are entrusted with protection of sensitive and private information of their clients and clients prefer to use such institutions to manage storage and distribution of sensitive information, particularly when working with less-trustworthy third party systems. Conventional approaches for managing the sharing of sensitive or private information involve storing information within a user device application. However, clients may be uncomfortable with the risk involved in storing information within a single application. Further, conventional approaches, in a user interaction with a third party system, may provide sensitive/private information to third parties beyond that which is required for the interaction, which introduces risks for clients.

SUMMARY

The present disclosure describes techniques for providing, by a data management system, control over sharing information with third party systems. For example, a trusted data management system (TDMS) receives, from a third party system, a request for user data and a user identifier. The TDMS identifies a data sharing schema from a set of data sharing schemas associated with the user identifier. The data sharing schema defines a subset of data values of the user data. The data sharing schema also defines, for each data value of the subset of data values of the subset of the user data, a format for transmitting the data value. The TDMS retrieves, from a data storage unit, the subset of data values of the user data. The TDMS formats each data value of the subset of data values in accordance with the respective defined format of the data value. The TDMS transmits, to the third party system, the subset of user data in accordance with the data sharing schema.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a trusted data management system to securely share data with third party systems that request it. Certain embodiments described herein improve the security of conventional data management systems by, for example, providing only a minimum amount of data required for specific user interactions with third party systems by defining data sharing schemas. The methods described herein reduce data transmission burdens of third party systems by providing only a minimum amount of information specified in a schema, which is less than is transmitted in conventional data sharing operations.

The following non-limiting example is provided to introduce certain embodiments. In certain embodiments, a user establishes an account with a trusted data management system (TDMS). In some instances, the TDMS is a financial institution, a government institution, an educational institution, a business institution, or other entity with which the user entrusts information for the TDMS to securely store and, in some instances, share with third party systems under conditions authorized by the user. The user can access the TDMS using a user device and uploads user information (e.g., name, user identifiers, demographic information, financial account numbers, user device data, and other information) to the user's TDMS account. The TDMS stores the uploaded user information.

The user can define data sharing schemas for sharing the uploaded information with third party systems. For example, the user can establish a schema for sharing specific subsets of the user information with third party systems of a particular type or for a specific third party system (to be associated with a third party system identifier). In some instances, the schema can specify, for each of the data in the subset of user information, a format (e.g., encrypted, non-encrypted, etc.) for sending the data to a requesting third party system. For example, the user information could include a name, a date of birth, a social security number, and an age. In this example, a schema for third party system that is a liquor store could specify sharing only the age (which is necessary to determine legality of purchase in some jurisdictions) and none of the other user information. In this example, a schema for a hospital third party system could specify sharing the name and date of birth of the user and none of the other user information. In this example, a schema for a government institution third party system could specify sharing the name and date of birth in an unencrypted format, which the recipient can immediately access, and the social security number in an encrypted format, where the recipient (e.g., a government employee) can access the encrypted information only if the recipient possesses a key.

After defining various data sharing schemas with the TDMS, the TDMS shares the user information with a third party system in accordance with a data sharing schema. In some instances, the TDMS receives a request from a third party system responsive to the user having an interaction with the third party system. For example, the interaction includes a user accessing a website of the third party system using the user device and selecting a user interface object to proceed to a checkout page. In another example, the interaction includes a user entering a physical location of the third party system with the user device and an employee or other agent of the third party system requesting information of the user (e.g., associated with an identifier provided by the user). For example, the TDMS receives a request from a third party system and determines a type of third party system (e.g., hospital, liquor store, government agency, etc.) and retrieves a data sharing schema associated with the determined type. In another example, the TDMS retrieves a data sharing schema associated with a third party system identifier. In another example, the TDMS received data sharing scheme identifier in the request from the third party system retrieves a data sharing schema associated with the data sharing scheme identifier. In another example, responsive to receiving the request from the third party system, the TDMS transmits a list of stored data sharing schemes to the user device with a request for the user to select a data sharing scheme. In this example, the TDMS receives a user selection of a data sharing scheme from the user device and extracts the data sharing scheme selected by the user. The TDMS identifies the subset of user information defined in the data sharing schema, extracts the identified subset of user information, and transmits the subset of user information to the third party system. In some instances, the data sharing schema identifies a format in which to transfer one or more data of the defined subset of user information and the TDMS preprocesses each of the data to convert the data (if necessary) to its respective format as specified by the TDMS. For example, the format could include an unencrypted format, an encrypted format, an unredacted format, a redacted format, or other format defined in the data sharing schema.

In some instances, the third party system completes a transaction or performs another action based on the subset of user information received from the TDMS. For example, in the example of the liquor store third party system, the third party system verifies an age of the user so that the user can proceed with a purchase of a restricted item.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the following section, and further description is provided there.

Figure 1:
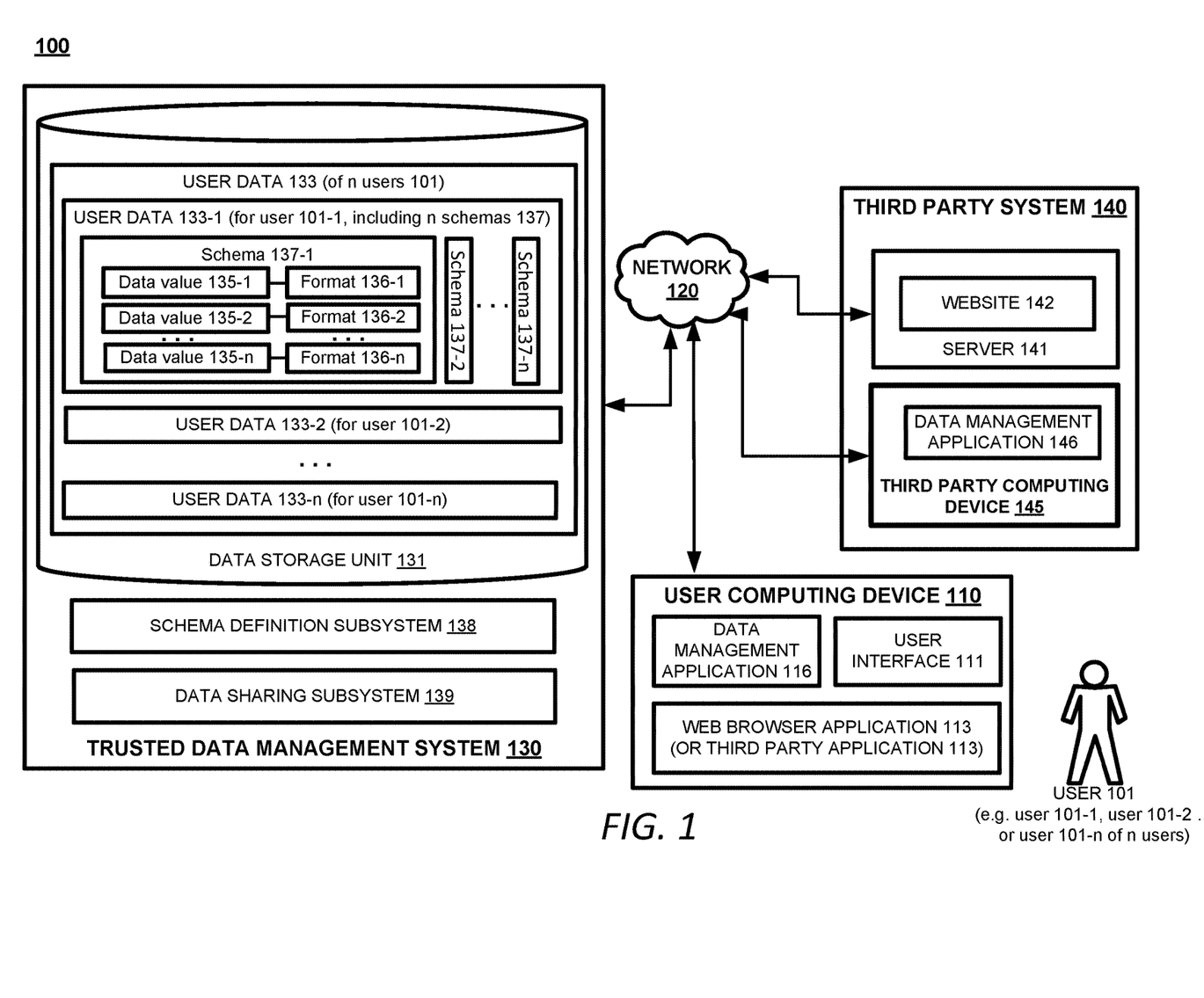
FIG. 1 depicts an example of a computing environment for providing control, by a trusted data management system, over sharing of information with third party systems, according to certain embodiments disclosed herein.

Example Operating Environment for Providing Control, by a Trusted Data Management System (TDMS), Over Sharing of User Information with Third Party Systems Referring now to the drawings, FIG. 1 depicts an example of a computing environment for providing control, by a trusted data management system, over sharing of information with third party systems, according to certain embodiments disclosed herein.

The computing environment 100 includes a trusted data management system (TDMS) 130 that can communicate via a network 120 with one or more third party systems 140 and one or more user computing devices 110. In some embodiments, the third party system includes a server 141 (which supports a website 142) and/or a third party computing device 145 (e.g., a point of service device or mobile device at a store location).

In certain embodiments, the user device includes a user interface 111, a data management application 116, and a web browser application 113.

The user interface 111 enables a user to interact with the user computing device 110. The user, in some instances, has an account with the TDMS 130 and also is a customer of one or more third party systems 140 with which the user can use the TDMS 130 to share information. The user interface 111 may be a touch screen interface, a voice-based interface, or any other interface that allows users to provide input and receive output from one or more applications on the user computing device 110. A user of the user computing device 110 may interact with a data management application 116 and a web browser application 113 (or a third party application 113) via the user interface 111. In an example, the user 101 interacts via the user interface 111 with the data management application 116 to establish an account with the TDMS 130, to upload user data 133 to the TDMS 130, and to define one or more data sharing schemas 137 for sharing subsets of the user data 133. Using the user interface 111, the user can interact with the web browser application 113 to access a website 142 (e.g., a shopping website) of a third party system 140 and/or can use a stand alone third party application 113 to access the website 142.

The data management application 116 is a program, function, routine, or similar entity that exists on and performs its operations on the user computing device 110. The data management application 116 is associated with the TDMS 130 and communicates with the TDMS 130 via the network 120, for example, with a schema definition subsystem 138 of the TDMS 130. In some instances, the user can access a website of the TDMS 130 using the web browser application 113, establish a user account with the TDMS 130, and download the data management application 116 to the user computing device 110. The user can upload user data 133 to the TDMS 130 using the data management application 116. The user can define one or more data sharing schemas 137 for sharing specific subsets of user data 133 (e.g., specific data values 135 of the user data 133) with specific third party systems 140 and/or types of third party systems 140.

The web browser application 113 is a program, function, routine, or similar entity that exists on and performs its operations on the user computing device 110. The web browser application 113 can be used to access a website 142 of a third party system 140, in a user 101 interaction with the third party system 130. The user 101 interaction, in some instances, is a purchase via the website 142. The user can interact with the third party system 140 using the web browser application 113. For example, in a user interaction, the user can, using the web browser application 113, access the website 142 of the third party system 140, add one or more items to a virtual shopping cart of the third party system 140, and request to perform a transaction with the third party system 140 to purchase the items, using the third party application 113.

In some instances, instead of the web browser application 113 or in addition to the web browser application 113, the user computing device 110 includes a third party application 113, which is a program, function, routine, or similar entity that exists on and performs its operations on the user computing device 110. The third party application 113 is associated with the third party system 140 and that communicates with the third party system 140 via the network 120, for example, with a server 141 of the third party system 140. In some instances, the user can access a website of the third party system 140 using the web browser application 113, establish a user account with the third party system 140, and download the third party application 113 to the user computing device 110. The user can interact with the third party system 140 using the third party application 113. For example, in a user interaction, the user can add one or more items to a virtual shopping cart of the third party system 140 and request to perform a transaction with the third party system 140 to purchase the items, using the third party application 113.

The trusted data management system (TDMS) 130 can communicate with one or more user computing devices 110 and one or more third party systems 140 via the network 120. In certain embodiments, the TDMS 130 includes a data storage unit 131, a schema definition subsystem 138, a data sharing subsystem 139.

The data storage unit 131 may comprise a local or remote storage device or other memory suitable for storing information and accessible to the TDMS 130. The TDMS 130 can store, in the data storage unit 131, user data 133 of a set of n users 101 having accounts with the TDMS 130. For each of the users 101 (e.g., users 101-1, 101-2, . . . 101-n), the TDMS 130 can store, in the data storage unit 131, respective user data 133 (e.g., user data 133-1, 133-2, . . . 133-n) and a set of n data sharing schemas 137 for each of the users 101. Each of the data sharing schemas 137 can define n data values 135 that are a subset of the user data 133 of the specific user 101. For example, for user 101-1, a first data sharing schema 137-1 defines a subset of data values 135-1, 135-2, . . . 135-n for sharing with third party systems 140. In this example, the user data 133-1 can also include additional defined data sharing schemas 137-2, . . . 137-n for the specific user 101-1, where each of the additional defined data sharing schemas 137 include a respective set of defined data values 135. In some instances, for each of the subset of data values 135-1, the TDMS 130 stores, in the data storage unit 131, a respective format (e.g., formats 136-1, 136-2, . . . 136-n corresponding to n data values 135-1, 135-2, . . . 135-n) for sharing the data value. For example, a format 136 can define that the associated data value should be encrypted before transmission to the third party system 10 or defined that the data value should be transmitted unencrypted. Other user data (e.g., 133-2, . . . 133-n) for other users (e.g., users 101-2, . . . 101-n) can similarly include defined schemas 137 which specify subsets of data values 135 as well as formats for transmission of each data value of the subsets of data values 135.

In certain embodiments, the schema definition subsystem 138 receives user data 133 from a users 101, stores the user data 133 in the data storage unit 131, and defines, in accordance with input from users 101, data sharing schemas 137 for the user data 133. For example, the schema definition subsystem 138 receives user data 133-1 input by a user 101-1 from a user computing device 110 of the user 101-1. The schema definition subsystem 138, in some instances, can provide a form or other means for display on the user interface 111 into which the user 101-1 can input data values 135 of the user data 133-1. The schema definition subsystem 138 can display, via the user interface 111, one or more predefined schemas 137 for the selection and activation by the user 101-1. Each of the predefined schemas 137 (e.g., schemas 137-1, 137-2, . . . 137-n) can include a respective set of data values 135 (e.g., 135-1, 135-2, . . . 135-n) and, for each data value, a respective format 136 (e.g., format 136-1, format 136-2, . . . format 136-n). In certain embodiments, the schema definition subsystem 138 can display, via the user interface 111, an interface that enables the user 101-1 to create a custom schema 137 by selecting specific data values 135 for inclusion into the custom schema 137 and assigning, in some instances, a format 136 for sharing of each of the specific data values 135. An example format 136 can define an encryption for the associated data value 135 or can define that the data value 135 remain unencrypted. In some instances, the format 136 can define a redaction (or non-redaction) of an associated data value 135. For example, the data value 136-2 is a social security number 123-45-6789 and the format 136-2 specifies that the social security number be redacted as *--6789 to a requesting third party system 140, where the * represents dummy values/characters. In some instances, the format 136 can define a portion (or an entirety) of an associated data value 135 to transmit, for example, the format 136-2 for the social security number in the previous example could specify that only the last four digits, 6789, be transmitted to a requesting third party system 140. The schemas 137 can, in some instances, define a type of requesting third party system 140 (e.g., hospital, merchant, restricted item merchant, government, educational, advertiser, etc.), a specific requesting third party system 140 (e.g., by defining a specific third party system 140 identifier, for example, merchant A), a location associated with a merchant, or other information that can be used to select a schema 137 to control a sharing of user data 133-1 with a requesting third party system 140.

In certain embodiments, the data sharing subsystem 139 receives a request for user data 133 from a third party system 140. In certain embodiments the data sharing subsystem 139 receives the request from a server 141 the third party system 140. In certain embodiments, the data sharing subsystem 319 receives the request from a third party computing device 145 (e.g., a mobile device) of the third party system 140. The data sharing subsystem 139 identifies a schema 137 for sharing user data 133 with the requesting third party system 140. For example, the request includes a user 101-1 identifier and the data sharing subsystem 139 identifies a set of schemas 137 (e.g., schemas 137-1, 137-2, . . . 137-n) defined for user data 133-1 of the user 101-1. The request, in some instances, includes a third party system 140 identifier or a type indicator (e.g., hospital, government, merchant, advertiser, etc.) that identifies a type of third party system 140. The data sharing subsystem 139 can select a specific schema 137-1 associated with the received identifier or type indicator. In some instances, the data sharing subsystem 139, responsive to receiving the request from the third party system 140, transmits a list of schemas 137 to the user device 110 that are associated with the user data 133-1 with a request for the user 101-1 to select a schema 137 and receives, from the user computing device 110, a selection of a specific schema 137-1.

The data sharing subsystem 139 transmits, to the requesting third party system 140, a subset of user data 133-1 in accordance with the selected data sharing schema 137-1. In some embodiments, before transmitting any user data 133-1 to the requesting third party system 140, the data sharing system 139 displays, via the user computing device 110, a request to authorize sharing of data with the requesting third party system 140 in accordance with a selected schema 137-1 and receives, via an input of the user 101-1 to the user interface 111, an approval of the request to authorize sharing. Transmitting the subset of user data 133-1 in accordance with the selected schema 137-1 includes retrieving a set of data values (e.g., data values 135-1, 135-2, . . . 135-*n*) defined by the schema 137-1, and formatting each of the set of data values 135 based on a respective associated format 136 definition (e.g., formats 136-1, 136-2, . . . 136-*n*). The data sharing subsystem 139 transmits the formatted data values 135 to the requesting third party system 140.

The TDMS 130 (including the schema definition subsystem 138 and the data sharing subsystem 139) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the TDMS 130 can be implemented using more or fewer systems or subsystems than those shown in FIG. 1, may combine two or more subsystems, or may have a different configuration or arrangement of the systems or subsystems.

In certain embodiments, the third party computing system 140 includes a server 141, which supports a website 142. In certain embodiments, the third party computing system 140 includes a third party computing device 145 in addition to, or instead of, the server 141 and website 142. In certain embodiments, the third party system 140 participates in an interaction with a user 101-1 and requests user data 133-1 for the user 101-1 from the TDMS 130. For example, the user interaction is an online purchase or other online interaction conducted by the user 101-1 with the website 142 using the user computing device 110. In another example, the user interaction is an in person interaction at the third party computing device 145. For example, the third party computing device 145 could be a point of sale device, a mobile device, or other device at a location of the third party computing system 140. The third party system 140 can include a user identifier to identify the user, for example, an identifier of a TDMS 130 account. In some instances, the third party system 140 can receive user computing device 110 data to include in the request for user data 133-1, which can include a user computing device 110 identifier. In some embodiments, the third party system 140 includes, in the request for the user data 133-1, a type identifier (e.g., hospital, government, merchant, advertiser, etc.) that identifies a type associated with the third party system 140. In some embodiments, the third party system 140 includes, in the request for the user data 133-1, a third party system 140 identifier identifying itself. The third party system 140 can receive, from the TDMS 130, a subset of user data 133-1 selected and formatted according to a data sharing schema 137-1 selected by the TDMS 130.

Figure 2:
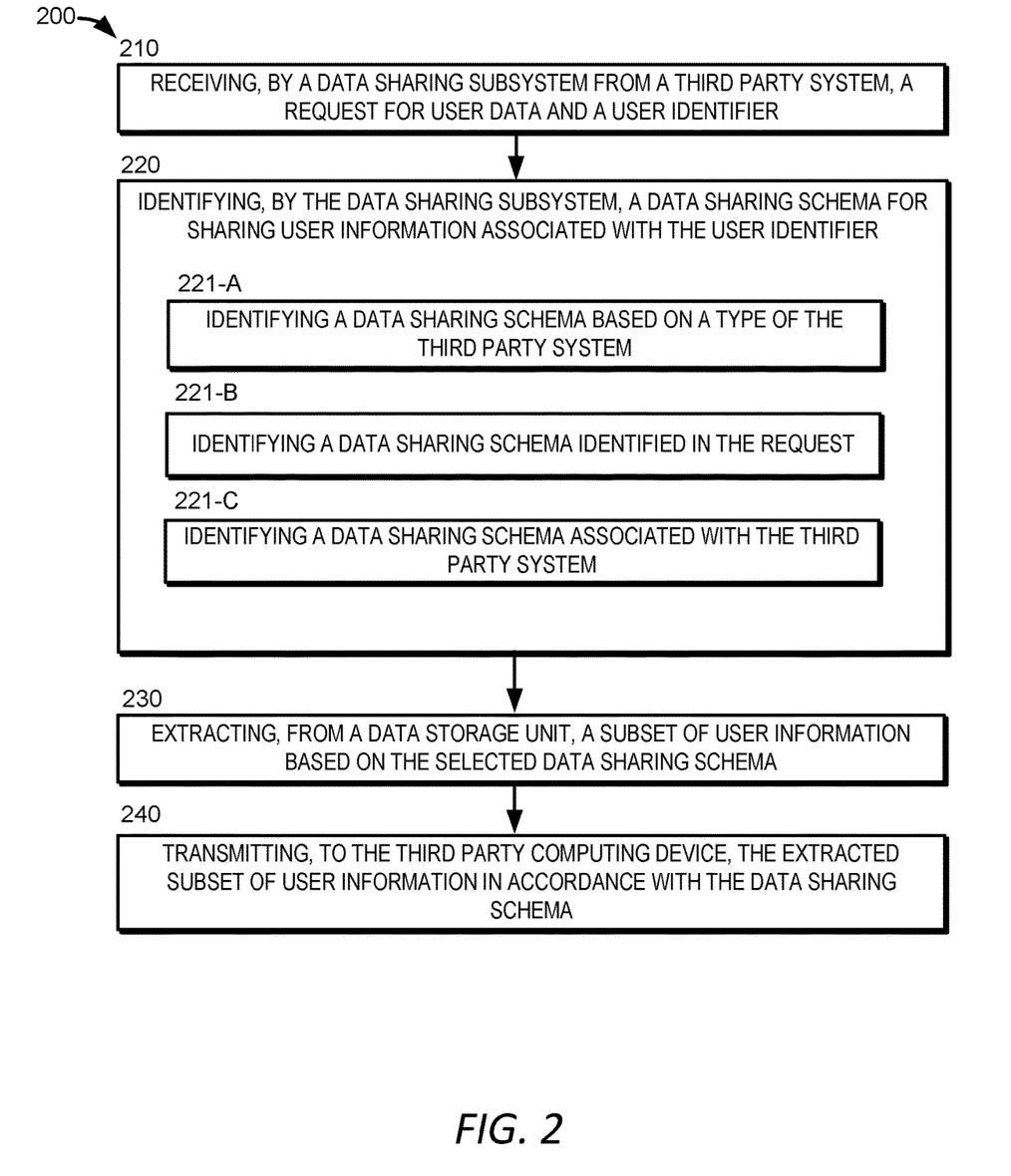
FIG. 2 depicts an example of a process for providing, by a trusted data management system, user information to a third party system in accordance with a data sharing schema defined in a user profile, according to certain embodiments disclosed herein.

Examples of Computer-Implemented Operations for Providing by a Trusted Data Management System (TDMS) User Information to a Third Party System in Accordance with a Data Sharing Schema FIG. 2 depicts an example of a process for providing, by a trusted data management system (TDMS) 130, user information to a third party system 140 in accordance with a data sharing schema 137 defined in a user profile, according to certain embodiments disclosed herein. One or more computing devices (e.g., smart coach computing system 130 or the individual modules contained therein) implement operations depicted in FIG. 2. For illustrative purposes, the process 200 is described with reference to certain examples depicted in the figures. Other implementations, however, are possible.

In certain examples, the TDMS 130 can facilitate secure sharing of user data 133-1 of a user 101-1 with a requesting third party system 140 based on a data sharing schema 137-1 selected from among a set of data sharing schemas 137 associated with the user 101-1. For example, the user initiates an online or in person interaction with the third party system 140 and the third party system 140 requests data associated with the user 101-1 that is necessary for an interaction with the user. For example, the third party system 140 is a merchant who sells restricted items (e.g., a liquor store) and the third party system 140 needs to know the user's 101-1 age but does not need the name of the user or insurance information. The TDMS 130 transmits a subset of user data 133-1 to the requesting third party system 140, where the subset includes specific data values 135 in associated formats 136. The third party system 140 completes the interaction with the user 101-1 based on the received subset of user data 133-1. For example, the third party system 140 approves the sale of a restricted item after comparing the received age information against a threshold legal age to purchase the restricted item. In another example, the hospital third party system 140 files an insurance claim using the subset of user information including name, date of birth, and insurance information.

In certain embodiments, the TDMS 130 acts as a decentralized storage system (e.g., a blockchain) for storing user data 133-1, including the schemas 137 defined for the user data 133-1. In these other embodiments, the TDMS 130 can generate a digital safe token and store this token within the TDMS 130. In these other embodiments, the requesting third party systems 140 can request and receive a subset of user data 133-1 in accordance with a schema 137. The TDMS 130 may receive user update data from a user device and may use a backend engine to process the user update data to update the digital safe token.

At block 210, the method 200 involves receiving, by a data sharing subsystem 139 from a third party system 140, a request for user data and a user identifier. In some instances, the TDMS receives a request from the third party system 140 for user data 133-1 responsive to the user 101-1 having an interaction with the third party system 140. For example, the interaction can be the user 101-1 accessing a merchant website 142 of the third party system 140 using the user device 110 and selecting a user interface 111 object to proceed to a checkout page and to request to purchase items in a virtual shopping cart. In another example, the interaction includes a user entering a physical location of the third party system 140 and an employee or other agent of the third party system 140 requesting information of the user (e.g., associated with an identifier provided by the user or provided by the user to a third party computing device 145 via the user computing device 110). In some instances, the user identifier is an account identifier associated with the user 101-1 that is assigned by the TDMS 130 when the user 101-1 establishes an account with the TDMS 130. In some instances, the user identifier is a one or more data values 135 of the user data 133-1 of the user 101-1 specific enough to identify the user 101-1 from among the users 101 having accounts with the TDMS 130, for example, a telephone number data value 135.

At block 220, the method 200 involves identifying by the data sharing subsystem 139, a data sharing schema 137 for sharing user information associated with the user identifier. The data sharing subsystem 139 can determine user data 133-1 for the user based on the received user identifier. The user data 133-1 includes a full set of data values 135 as well as a set of schemas 137, where each schema 137 identifies a particular subset of the set of data values 135 and, for each of the data values of the particular subset, a format 136 in which to transmit the data value 135.

In some instances, implementing block 220 involves performing one of sub-blocks 221-A, 221-B, 221-C, or 221-D.

In some embodiments, at sub-block 221-A, the method for implementing block 220 involves identifying, by the data sharing subsystem 139, a data sharing schema 137 based on a type of the third party system 140. For example, the TDMS 130 determines a type of third party system (e.g., hospital, liquor store, government agency, etc.) and retrieves a data sharing schema associated with the determined type. In some instances, the type can be indicated in the request received from the third party system 140 in block 210. In some instances, the type can be determined based on a name of the third party system 140 included in the request received in block 210. For example, the data sharing subsystem 139 identifies the type "hospital" based on "Mercy Unlimited Hospital" being listed as the name of the third party system 130 in the request received at block 210. The data sharing subsystem 139 may access a list of terms associated types and determine the type based on terms in the request also identified in the list. For example, the list may specify terms "school," "college," "university," "academy," as terms being associated with a schema 137 associated with a third party system 140 type of "educational institution." The list may include terms for each of a set of third party system 140 types and further associate each of the types with a specific schema 137 for the user data 133-1.

In some embodiments, at sub-block 221-B, the method for implementing block 220 involves identifying, by the data sharing subsystem 139, a data sharing schema 137 identified in the request received in block 210. For example, the request received in block 210 includes a schema 137 identifier and the TDMS 130 retrieves the schema 137 associated with the schema 137 identifier.

In some embodiments, at sub-block 221-C, the method for implementing block 220 involves identifying, by the data sharing subsystem 139, a data sharing schema 137 associated with the third party system 140 from which the request in block 210 is received. For example, the request received in block 210 includes a third party system 140 identifier and the TDMS 130 retrieves a data sharing schema 137 associated with the third party system 140 identifier. The third party system 140 identifier could be a name, a location, an account number of the third party system 140 assigned by the TDMS 130 at a time of registration of the third party system 140 with the TDMS 130, or other identifier.

In some embodiments, at sub-block 221-D, the method for implementing block 220 involves identifying, by the data sharing subsystem 139, a data sharing schema 137 selected by the user via the computing device 110. For example, the data sharing subsystem 139 transmits a request to the user computing device 110 to display a list of data sharing schemas 137. In this example, the data sharing subsystem 139 receives, via the user computing device 110, a selection of a data sharing schema 137 from the list of data sharing schemas 137.

From block 220, the method 200 proceeds to block 230.

At block 230, the method 200 involves retrieving, by the data sharing subsystem 139 from a data storage unit 131, a subset of user information in accordance with the data sharing schema 137 selected in block 220. For example, the TDMS 130 identifies a subset of user data 133-1 specified in the data sharing schema, extracts the identified subset of user data 133-1 including a set of data values 135-1, 135-2, . . . 135-n, where each of the data values is associated with a respective format 136-1, 136-2, . . . 136-n. The TDMS 130 formats, as necessary, each of the set of data values 135-1, 135-2, . . . 135-n based on its respective indicated format 136-1, 136-2, . . . 136-n and transmits the set of data values 135-1, 135-2, . . . 135-n to the third party system 140.

In some instances, the TDMS 140 preprocesses one or more data values 135 to convert the data (if necessary) to its respective format 136 as specified by the schema 137. For example, the format could include an unencrypted format, an encrypted format, an unredacted format, a redacted format, or other format defined in the data sharing schema 137 and the TDMS 140 processes, as necessary, the data value 135 so that the data value 135 is in the specified format prior to transmission of the set of data values to the third party system 140. For example, the data value 135 is stored in an unencrypted format and the format 136 specified for transmission is encrypted. In this example, the data sharing subsystem 139 encrypts the data value 135 so that it is in the encrypted format specified in the schema 137.

An example format 136 can define an encryption for the associated data value 135 or can define that the data value 135 remain unencrypted. In some instances, the format 136 can define a redaction (or non-redaction) of an associated data value 135. For example, the data value 136-2 is a social security number 123-45-6789 and the format 136-2 specifies that the social security number be redacted as \*\*\*-\*\*-6789 to a requesting third party system 140, where the \* represents dummy values/characters. In some instances, the format 136 can define a portion (or an entirety) of an associated data value 135 to transmit, for example, the format 136-2 for the social security number in the previous example could specify that only the last four digits, 6789, be transmitted to a requesting third party system 140.

At block 240, the method 200 involves transmitting, to the third party computing system, the subset of user information retrieved in block 230 in accordance with the data sharing schema 137 selected in block 220. In some embodiments, before transmitting any subset of user data 133-1 to the requesting third party system 140, the data sharing system 139 displays, via the user computing device 110, a request to authorize sharing of data with the requesting third party system 140 in accordance with a particular schema 137-1 and receives, via an input of the user 101-1 to the user interface 111, an approval of the request to authorize sharing.

In some instances, the third party system 140 completes a transaction or performs another action based on the subset of user data 133-1 received from the TDMS 130. For example, in the example of a third party system 130 that sells a restricted item (e.g., alcohol), the third party system 140 verifies an age data value 135 of the user received from the TDMS 130 do determine whether the user can proceed with a purchase of a restricted item. In some embodiments, the user interaction is an online purchase or other online interaction conducted by the user 101-1 with the website 142 using the user computing device 110. In these embodiments, the website 142 receives the subset of user data 133-1 from the TDMS 130, for example information required to complete a credit card transaction, and proceeds to process the transaction. In another example, the user interaction is an in person interaction at the third party computing device 145.

Figure 3:
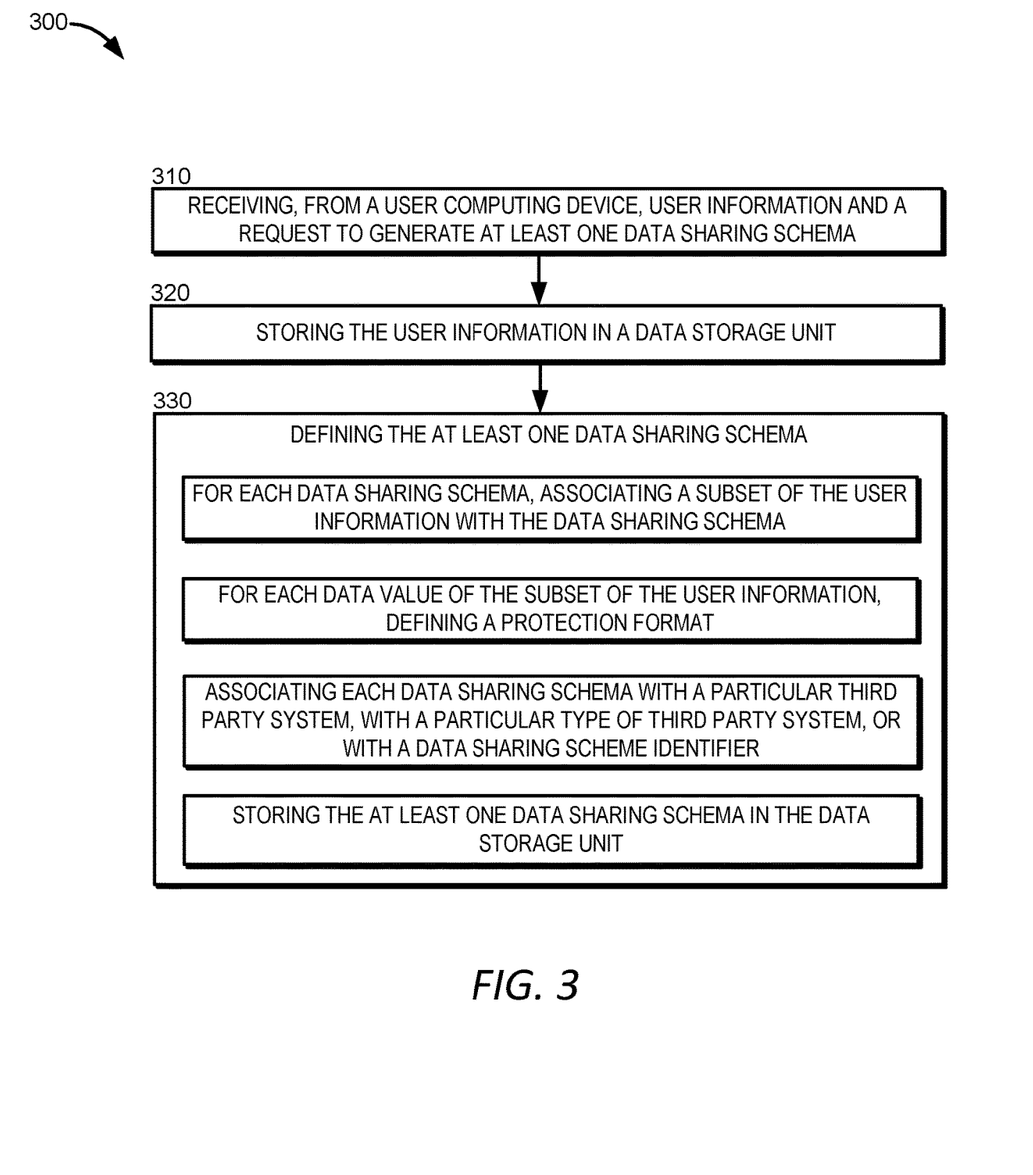
FIG. 3 depicts an example of a process for generating, by a trusted data management system, a user profile for selective sharing of information with third party systems, according to certain embodiments disclosed herein.

FIG. 3 depicts an example of a process for generating, by a trusted data management system (TDMS) 130, a user profile for selective sharing of information with third party systems 140, according to certain embodiments disclosed herein. One or more computing devices (e.g., the server 141 and website 142 and/or the third party computing device 145) implement operations depicted in FIG. 3. For illustrative purposes, the process 300 is described with reference to certain examples depicted in the figures. Other implementations, however, are possible.

At block 310, the method 300 involves receiving, by the schema definition subsystem 138 from a user computing device 110, user information of a user 101 and a request to generate at least one data sharing schema 137. In some instances, a user 101-1 accesses an account of the user 101-1 with the TDMS 130 using the data management application 116 and provides user data 133-1 to the TDMS 130 via the user interface 111. The schema definition subsystem 138 stores the user data 133-1 in the data storage unit 131. For example, the user data 133-1 includes a name, a street address, a city, a state, a zip code, a telephone number, a date of birth, an age, one or more preferences of the user 101-1, a social security number or other document identifier, a drivers license number, one or more financial account numbers, or other user data 133-1. In some instances, the schema definition subsystem 138 receives user data 133-1 input by a user 101-1 from a user computing device 110 of the user 101-1. The schema definition subsystem 138, in some instances, can provide a form or other means for display on the user interface 111 into which the user 101-1 can input data values 135 of the user data 133-1.

At block 320, the method 300 involves storing, by the schema definition subsystem 138, the user information in a data storage unit 131. For example, the schema definition subsystem 138 associates each of the data values 135 (e.g., name, address, city, state, zip code, telephone number, etc.) with the account (e.g., with an account identifier) of the user 101-1 and stores the associated data values 135 in the data storage unit 131.

In some embodiments, certain data values 135 of user data 133-1 received from the user computing device 110 corresponding to particularly sensitive data fields may be encrypted by the user computing device 110 prior to (or as part of) receipt by the TDMS 130. For instance, a user computing device 110 may be configured to encrypt the data based on a user privacy provision rule set prior to transmission of the data to the TDMS 130 and further, the user computing device 110 may not share a decryption key with the TDMS 130. Since the TDMS 130 is not provided with the true value of the user data and does not possess a decryption key, it may only store the encrypted version of the data value. As such, data fields encrypted by a user computing device 110 may be provided with an extra layer of security as only the user computing device 110 may decrypt the data field.

At block 330, the method 300 involves defining, by the schema definition subsystem 138, the at least one data sharing scheme 137. The schema definition subsystem 138 defines, in accordance with input from users 101, data sharing schemas 137 for the user data 133. The schema definition subsystem 138 can display, via the user interface 111, one or more predefined schemas 137 for the selection and activation by the user 101-1. Each of the predefined schemas 137 (e.g., schemas 137-1, 137-2, . . . 137-n) can include a respective set of data values 135 (e.g., 135-1, 135-2, . . . 135-n) and, for each data value, a respective format 136 (e.g., format 136-1, format 136-2, . . . format 136-n). In certain embodiments, the schema definition subsystem 138 can display, via the user interface 111, an interface that enables the user 101-1 to create a custom schema 137 by selecting specific data values 135 for inclusion into the custom schema 137.

In certain embodiments, implementing block 330 involves implementing sub-blocks 331, 333, 335, 337, and 339.

At sub-block 331, implementing block 330 involves associating, by the schema definition subsystem 138 for each data sharing schema 137, a subset of user information with the data sharing schema 137. The schema definition subsystem 138 associates the specific data values 135 specified in a schema 137 with a schema identifier.

At sub-block 333, implementing block 330 involves defining, by the schema definition subsystem 138 for each data value 135 of the subset of user information of sub-block 331, a format 136. The schema definition subsystem 138 assigns, in some instances, a format 136 for sharing of each of the specific data values 135. An example format 136 can define an encryption for the associated data value 135 or can define that the data value 135 remain unencrypted. For example, the format 136 may specify one of plain text, encrypted text, or cipher text. In some instances, the format 136 can define a redaction (or non-redaction) of an associated data value 135. For example, the data value 136-2 is a social security number 123-45-6789 and the format 136-2 specifies that the social security number be redacted as *--6789 to a requesting third party system 140, where the * represents dummy values/characters. In some instances, the format 136 can define a portion (or an entirety) of an associated data value 135 to transmit, for example, the format 136-2 for the social security number in the previous example could specify that only the last four digits, 6789, be transmitted to a requesting third party system 140.

At sub-block 335, implementing block 330 involves associating, by the schema definition subsystem 139, each of the data values of sub-block 333 with a particular type of a third party system 140, with a particular third party system 140, or with a data sharing scheme 137 identifier. The schemas 137 can, in some instances, define a type of requesting third party system 140 (e.g., hospital, merchant, restricted item merchant, government, educational, advertiser, etc.), a specific requesting third party system 140 (e.g., by defining a specific third party system 140 identifier, for example, merchant A), a location associated with a merchant, or other information that can be used to select a schema 137 to control a sharing of user data 133-1 with a requesting third party system 140.

At sub-block 335, implementing block 330 involves storing, by the schema definition subsystem 138, the at least one data sharing schema 137 in the data storage unit 131. In some instances, the schema definition subsystem 138 only stores, in the user's 101-1 account, schemas 137 that are activated by the user or custom created by the user. In some embodiments, a schema identifier is associated with each of the schemas 137. For each of the schemas 137, each of a subset of data values 135 is associated with a respective defined format 136 for the data value 135. Each of the schemas 137 is associated with a third party system 140 type, a third party system 140 identifier, and/or a schema 137 identifier. Data sharing schemas 137 generated according to method 300 can be used in method 200. For example, the TDMS 130 can identify a schema 137 generated according to method 300 and transmit a subset of user data 133-1 using the schema 137 to a requesting third party system 140.

Examples of Computing Environments for Implementing Certain Embodiments

Figure 4:
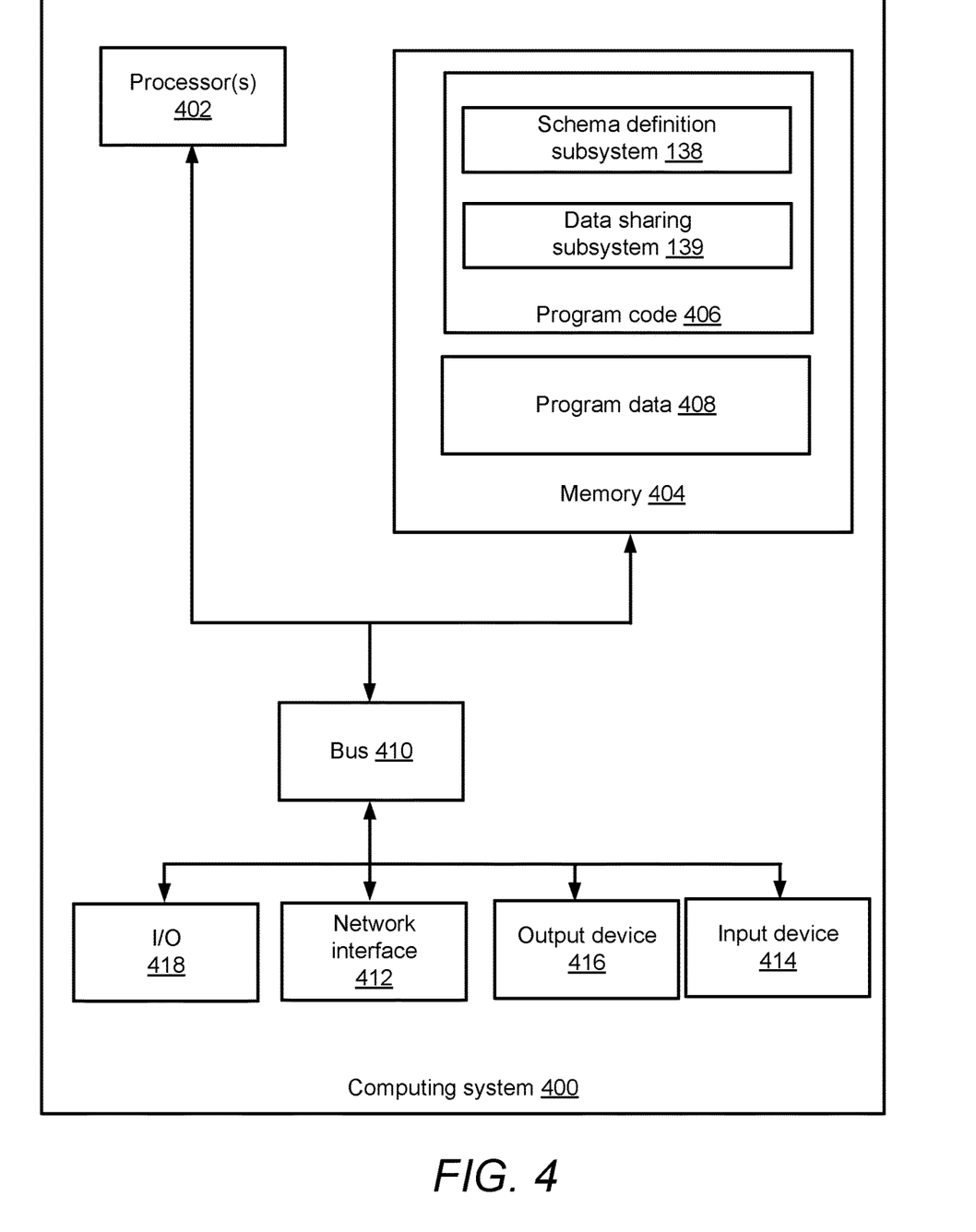
FIG. 4 depicts an example of a computing system that performs certain operations described herein, according to certain embodiments described in the present disclosure.

Any suitable computer system or group of computer systems can be used for performing the operations described herein. For example, FIG. 4 depicts an example of a computer system 400. The depicted example of the computer system 400 includes a processor 402 communicatively coupled to one or more memory devices 404. The processor 402 executes computer-executable program code stored in a memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including a single processing device.

The memory device 404 includes any suitable non-transitory computer-readable medium for storing program code 406, program data 408, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1104 can be volatile memory, non-volatile memory, or a combination thereof.

The computer system 400 executes program code 406 that configures the processor 402 to perform one or more of the operations described herein. Examples of the program code 406 include, in various embodiments, the subsystems 138 and 139 of FIG. 1, which may include any other suitable systems or subsystems that perform one or more operations described herein (e.g., one or more neural networks, encoders, attention propagation subsystem and segmentation subsystem). The program code 406 may be resident in the memory device 504 or any suitable computer-readable medium and may be executed by the processor 402 or any other suitable processor.

The processor 402 is an integrated circuit device that can execute the program code 406. The program code 406 can be for executing an operating system, an application system or subsystem, or both. When executed by the processor 402, the instructions cause the processor 402 to perform operations of the program code 406. When being executed by the processor 402, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 404 store the program data 408 that includes one or more datasets described herein. In some embodiments, one or more of data sets are stored in the same memory device (e.g., one of the memory devices 404). In additional or alternative embodiments, one or more of the programs, data sets, models, and functions described herein are stored in different memory devices 404 accessible via a data network. One or more buses 410 are also included in the computer system 400. The buses 410 communicatively couple one or more components of a respective one of the computer system 400.

In some embodiments, the computer system 400 also includes a network interface device 412. The network interface device 412 includes any device or group of devices suitable for establishing a wired or wireless data connection to one or more data networks. Non-limiting examples of the network interface device 412 include an Ethernet network adapter, a modem, and/or the like. The computer system 400 is able to communicate with one or more other computing devices via a data network using the network interface device 412.

The computer system 400 may also include a number of external or internal devices, an input device 414, a presentation device 416, or other input or output devices. For example, the computer system 400 is shown with one or more input/output ("I/O") interfaces 418. An I/O interface 418 can receive input from input devices or provide output to output devices. An input device 414 can include any device or group of devices suitable for receiving visual, auditory, or other suitable input that controls or affects the operations of the processor 402. Non-limiting examples of the input device 414 include a touchscreen, a mouse, a keyboard, a microphone, a separate mobile computing device, etc. A presentation device 416 can include any device or group of devices suitable for providing visual, auditory, or other suitable sensory output. Non-limiting examples of the presentation device 416 include a touchscreen, a monitor, a speaker, a separate mobile computing device, etc.

Although FIG. 4 depicts the input device 414 and the presentation device 416 as being local to the computer system 400, other implementations are possible. For instance, in some embodiments, one or more of the input device 414 and the presentation device 416 can include a remote client-computing device that communicates with computing system 400 via the network interface device 412 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which a smart coach computing system performs operations comprising:
   receiving, by a trusted data management system (TDMS) from a third party system, a request for user data and a user identifier, the request being automatically triggered responsive to a user interaction accessing a website associated with the third party system, wherein the user identifier identifies a user and the user data is associated with the user;
   identifying a type for the third party system by:
      retrieving a list of terms associated with a data sharing schema; and
      determining that a name of the third party system is associated with a term in the list of terms;
   identifying, by the TDMS, the data sharing schema, wherein identifying the data sharing schema comprises determining that the data sharing schema is associated with the type, the data sharing schema defining:
      a subset of data values of the user data; and
      a respective defined format for transmitting each data value of the subset of data values of the user data;

retrieving, by the TDMS from a data storage unit, the subset of data values of the user data;

formatting, by the TDMS, each data value of the subset of data values in accordance with the respective defined format of the data value; and transmitting, by the TDMS to the third party system, the subset of data values of the user data in accordance with the data sharing schema.

2. The computer-implemented method of claim 1, wherein formatting each data value of the subset of data values in accordance with the respective defined format of the data value comprises:

determining a stored format for each data value of the subset of data values; and for each data value of the subset of data values in which the stored format does not correspond to the respective defined format, preprocessing the data value to convert the data value from the stored format to the respective defined format, wherein the transmitted subset of data values includes the preprocessed data value.

3. The computer-implemented method of claim 1, wherein the request further comprises a third party system identifier, wherein identifying the data sharing schema comprises determining that the data sharing schema is associated with the third party system identifier.

4. The computer-implemented method of claim 1, wherein the request includes a data sharing schema identifier, wherein identifying the data sharing schema comprises retrieving the data sharing schema associated with the data sharing schema identifier.

5. The computer-implemented method of claim 1, wherein identifying the data sharing schema comprises:

transmitting, to a user computing device associated with the user, a list including a set of data sharing schemas associated with the user identifier and a request to display the list and a request for a selection from the set of data sharing schemas; and receiving from the user computing device, a selection of the data sharing schema from among the set of data sharing schemas.

6. A non-transitory computer-readable medium having program code that is stored thereon executable by one or more processing devices for performing operations comprising:

receiving, from a third party system, a request for user data and a user identifier, the request being automatically triggered responsive to a user interaction accessing a website associated with the third party system, wherein the user identifier identifies a user and the user data is associated with the user;

identifying a type for the third party system by:
retrieving a list of terms associated with a data sharing schema; and
determining that a name of the third party system is associated with a term in the list of terms;

identifying the data sharing schema, wherein identifying the data sharing schema comprises determining that the data sharing schema is associated with the type, the data sharing schema defining;
a subset of data values of the user data; and
a respective defined format for transmitting each data value of the subset of data values of the user data;

retrieving, from a data storage unit, the subset of data values of the user data;

formatting each data value of the subset of data values in accordance with a respective defined format of the data value; and transmitting, to the third party system, the subset of data values in accordance with the data sharing schema.

7. The non-transitory computer-readable medium of claim 6, wherein formatting each data value of the subset of data values in accordance with the respective defined format of the data value comprises:

determining a stored format for each data value of the subset of data values; and for each data value of the subset of data values in which the stored format does not correspond to the respective defined format, preprocessing the data value to convert the data value from the stored format to the respective defined format, wherein the transmitted subset of data values includes the preprocessed data value.

8. The non-transitory computer-readable medium of claim 6, wherein the request further comprises a third party system identifier, wherein identifying the data sharing schema comprises determining that the data sharing schema is associated with the third party system identifier.

9. The non-transitory computer-readable medium of claim 6, wherein the request includes a data sharing schema identifier, wherein identifying the data sharing schema comprises retrieving the data sharing schema associated with the data sharing schema identifier.

10. The non-transitory computer-readable medium of claim 6, wherein identifying the data sharing schema comprises:

transmitting, to a user computing device associated with the user, a list including a set of data sharing schemas associated with the user identifier and a request to display the list and a request for a selection from the set of data sharing schemas; and receiving from the user computing device, a selection of the data sharing schema from among the set of data sharing schemas.

11. A system, comprising:

a non-transitory computer readable medium comprising computer-executable program instructions that, when executed by a processor, cause the system to perform operations comprising:

receiving, from a third party system, a request for user data and a user identifier, the request being automatically triggered responsive to a user interaction accessing a website associated with the third party system, wherein the user identifier identifies a user and the user data is associated with the user;

identifying a type for the third party system by:
retrieving a list of terms associated with a data sharing schema; and
determining that a name of the third party system is associated with a term in the list of terms;

identifying the data sharing schema, wherein identifying the data sharing schema comprises determining that the data sharing schema is associated with the type, the data sharing schema defining;
a subset of data values of the user data; and
a respective defined format for transmitting each data value of the subset of data values of the user data;

retrieving, from a data storage unit, the subset of data values;

formatting each data value of the subset of data values in accordance with a respective defined format of the data value; and transmitting, to the third party system, the subset of data values in accordance with the data sharing schema.

12. The system of claim 11, wherein formatting each data value of the subset of data values in accordance with the respective defined format of the data value comprises:
- determining a stored format for each data value of the subset of data values; and
- for each data value of the subset of data values in which the stored format does not correspond to the respective defined format, preprocessing the data value to convert the data value from the stored format to the respective defined format, wherein the transmitted subset of data values includes the preprocessed data value.

13. The system of claim 11, wherein the request further comprises a third party system identifier, wherein identifying the data sharing schema comprises determining that the data sharing schema is associated with the third party system identifier.

14. The system of claim 11, wherein the request includes a data sharing schema identifier, wherein identifying the data sharing schema comprises retrieving the data sharing schema associated with the data sharing schema identifier.

* * * * *